United States Patent
Sunadome

(10) Patent No.: US 7,028,999 B2
(45) Date of Patent: Apr. 18, 2006

(54) POSITIONING STRUCTURE

(75) Inventor: Minoru Sunadome, Saitama (JP)

(73) Assignee: Pioneer Corporation, Tokyo (JP)

( * ) Notice: Subject to any disclaimer, the term of this patent is extended or adjusted under 35 U.S.C. 154(b) by 67 days.

(21) Appl. No.: 10/635,678

(22) Filed: Aug. 7, 2003

(65) Prior Publication Data

US 2004/0051221 A1    Mar. 18, 2004

(30) Foreign Application Priority Data

Aug. 23, 2002  (JP) .......................... P 2002-243198

(51) Int. Cl.
  *B23Q 1/00*  (2006.01)
(52) U.S. Cl. ......................................... 269/47; 269/900
(58) Field of Classification Search .................. 269/47, 269/900, 903, 289 R, 53, 69, 901
  See application file for complete search history.

(56) References Cited

U.S. PATENT DOCUMENTS

| | | | | |
|---|---|---|---|---|
| 5,388,316 A | * | 2/1995 | MacLaren | 29/281.5 |
| 5,418,688 A | * | 5/1995 | Hertz et al. | 361/790 |
| 5,566,840 A | * | 10/1996 | Waldner et al. | 211/41.17 |
| 6,199,260 B1 | * | 3/2001 | Ohmi et al. | 29/466 |
| 6,336,276 B1 | * | 1/2002 | Krajec et al. | 33/645 |
| 6,805,339 B1 | * | 10/2004 | Witte | 269/289 R |
| 2004/0051221 A1 | * | 3/2004 | Sunadome | 269/47 |

* cited by examiner

*Primary Examiner*—Lee D. Wilson
(74) *Attorney, Agent, or Firm*—Sughrue Mion, PLLC

(57) ABSTRACT

In a positioning structure, a pair of bosses which upstand from a main member are inserted into through holes of plural (for example, three) members to be pierced having a planar shape, whereby the members to be pierced are stacked and fixed, and the main member and the members to be pierced are relatively positioned to each other. In the positioning structure, each of the bosses is formed into a substantially cross shape as seen in the upstanding direction, and a positioning section is provided to respectively position the members to be pierced to plural predetermined positions along the inserting direction of the boss.

3 Claims, 12 Drawing Sheets

POSITIONING STRUCTURE

The present disclosure relates to the subject matter contained in Japanese Patent Application No. 2002-243198 filed Aug. 23, 2002, which is incorporated herein by reference in its entirety.

BACKGROUND OF THE INVENTION

1. Field of the Invention

The present invention relates to a positioning structure, and more particularly to a positioning structure which stacks and fixes a plurality of members to be pierced to a boss that is disposed on, for example, an operation panel of a car stereo.

2. Description of the Related Art

FIG. 1 is a sectional view showing a conventional positioning structure which stacks and fixes a plurality of members to be pierced to a boss that upstands from a main member. For example, this structure may be applied to a case where circuit boards and the like are fixed to an operation panel of a car stereo.

As shown in FIG. 1, a pair of pedestals 201 (only one pedestal is shown) are disposed on the rear face of an operation panel (main member) 200 of a car stereo or the like, and bosses 202 upstand from the pedestals 201, respectively. The bosses 202 are formed into a substantially cross shape as seen in the upstanding direction.

The bosses 202 are required to have a draft angle when they are injection molded integrally with the operation panel 200, and therefore are formed into a shape which is continuously tapered as advancing toward the tip end.

Through holes 204 of a resin housing (first member to be pierced) 203, through holes 206 of a resin member (second member to be pierced) 205, and through holes 208 of a substrate (third member to be pierced) 207 are fitted onto the bosses 202, whereby the resin housing 203, the resin member 205, and the substrate 207 are stacked and fixed to the rear face 200A of the operation panel (main member) 200.

The resin housing 203, the resin member 205, and the substrate 207 comprise the pairs of through holes 204, 206, and 208 to be pierced by the pair of bosses 202, respectively.

In the pairs of through holes 204 and 204, 206 and 206, and 208 and 208, the through holes 204, 206, and 208 on one side are formed into a circular shape of the same size, and the other through holes 204, 206, and 208 are formed into an elliptic shape of the same size. Since the other through holes 204, 206, and 208 are formed into an elliptic shape, it is possible to absorb a production error.

The pair of bosses 202 are formed into a tapered shape in order to ensure a draft angle, and the through holes 204, 206, and 208 are formed to be identical with each other in size and shape. When the through holes 204 of the resin housing 203, the through holes 206 of the resin member 205, and the through holes 208 of the substrate 207 are fitted onto the bosses, therefore, the gaps between the bosses 202 and the through holes 204, 206, and 208 are larger as the members are placed in a higher level.

Specifically, the fitting between one of the bosses 202 and one of the through holes 206 of the resin member 205 is looser than that between the boss 202 and one of the through holes 204 of the resin housing 203, and the fitting between the boss 202 and one of the through holes 208 of the substrate 207 is looser than that between the boss 202 and the through hole 206 of the resin member 205.

Consequently, the resin member 205 and the substrate 207 are moved along the surface direction in the directions of the arrows with respect to the operation panel (main member) 200 and the resin housing 203, so that an error may be caused in an assembling process, thereby causing the possibility that, for example, a switch failure occurs.

Since the resin housing 203, the resin member 205, and the substrate 207 are simply stacked, there is the possibility that the soft resin member 205 is crushed in the thickness direction by the resin housing 203 and the substrate 207 and its function is impaired.

SUMMARY OF THE INVENTION

The invention has been devised in view of the above discussed problems. It is an object of the invention to provide a positioning structure in which at least an assembly error can be suppressed, or a positioning structure in which a soft resin member can be prevented from being crushed by a resin housing and a substrate.

According to an aspect of the invention, there is provided a positioning structure including: a main member; a boss upstanding from the main member, the boss having a positioning section; and a plurality of members to be pierced each having a through hole through which the boss is inserted whereby the members to be pierced are stacked and fixed and the main member and the members to be pierced are relatively positioned to each other, wherein the positioning section positions the members to be pierced to predetermined positions along an inserting direction of the boss, respectively.

DETAILED DESCRIPTION OF THE PREFFERED EMBODIMENTS

Hereinafter, embodiments of the positioning structure of the invention will be described. It is assumed that the positioning structure of the invention is configured so that relative positioning is performed by shapes of through holes which are formed in a plurality of members to be pierced that are fitted onto bosses upstanding from a main member, and the shape of the bosses along an inserting direction thereof.

The bosses upstanding from the main member require a draft angle which is formed in order to facilitate the process of drawing the bosses that are injection molded integrally with an operation panel, from molds. Therefore, each of the bosses is formed into a shape that is tapered stepwise or continuously as advancing toward the tip end. The shapes of the through holes of the members to be pierced are set in accordance with the shapes of the bosses, and the sizes and shapes of the through holes correspond to the positions where the respective members are fitted onto the bosses. The attachment sequence of the members to be pierced which are to be attached to the main member is taken into consideration, so as to form the through holes such that the minimum inner dimensions of the through holes correspond to the respective width dimensions of the bosses. The width dimensions are dimensions in a direction perpendicular to the inserting direction.

The bosses may have a side shape which is symmetrical about a line elongating along the inserting direction. Alternatively, the bosses may have a side shape which is asymmetrical about a line elongating along the inserting direction, as far as the side shape corresponds to the minimum inner dimensions of the through holes of the members to be pierced.

Hereinafter, further specific examples of the mode for carrying out the invention will be described as first to ninth embodiments.

FIRST EMBODIMENT

Figure 1:
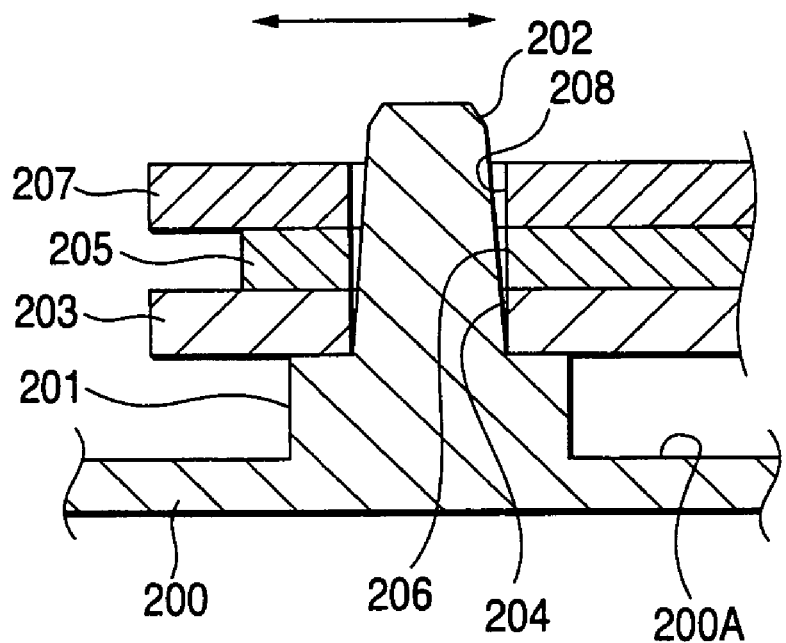
FIG. 1 is a sectional view showing a conventional positioning structure.
Figure 2:
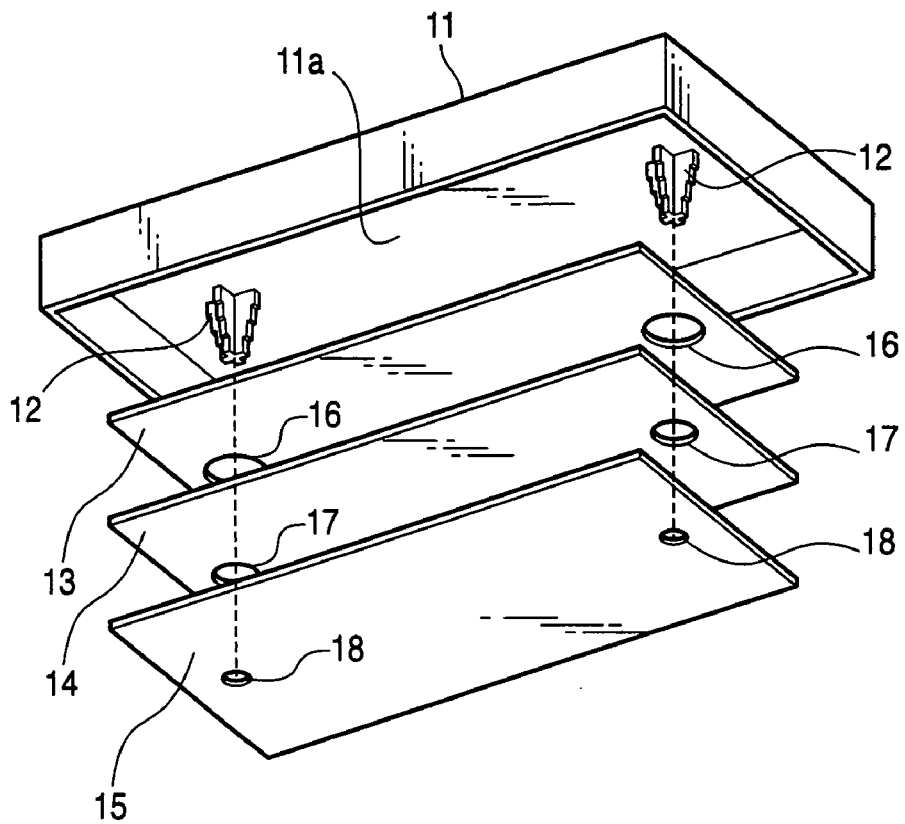
FIG. 2 is an exploded perspective view showing a first embodiment of the positioning structure of the invention.
Figure 3:
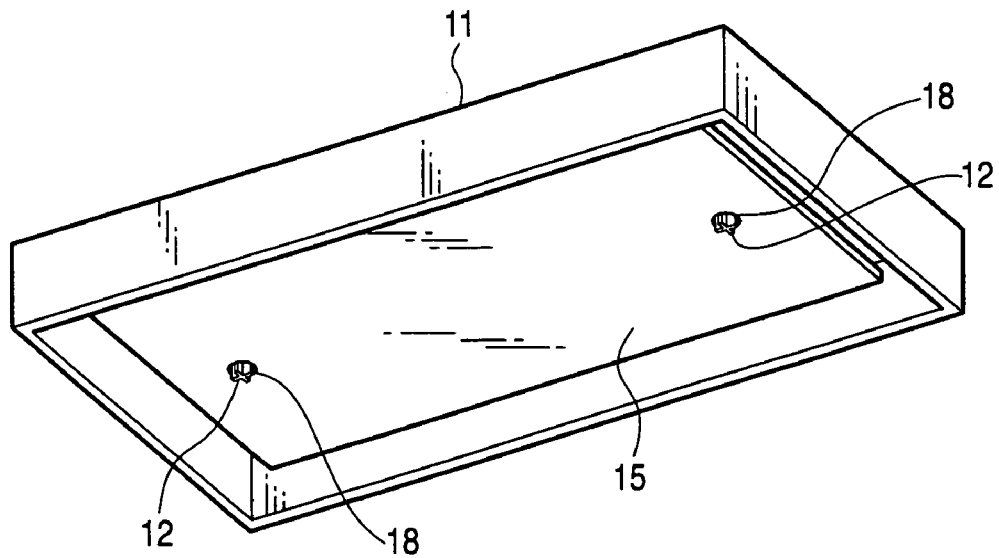
FIG. 3 is a perspective view showing the first embodiment of the positioning structure of the invention.

As shown in FIGS. 2 and 3, in a positioning structure 10 of the first embodiment, a pair of bosses 12 upstand via pedestals from the rear face 11a of a main member 11 such as an operation panel of a car stereo. The bosses 12 are formed into a substantially cross shape as seen in the upstanding direction.

The bosses 12 are required to have a draft angle when they are injection molded integrally with the main member 11, and therefore are formed into a shape which is stepwise tapered as advancing toward the tip end.

Through holes 16,16 of a first member to be pierced 13 such as a resin housing, through holes 17,17 of a second member to be pierced 14 such as a resin member, and through holes 18,18 of a third member to be pierced 15 such as a substrate are fitted onto the bosses 12, whereby the first to third members to be pierced 13 to 15 are stacked and fixed to the rear face 11a of the main member 11, and the main member 11 and the first to third members to be pierced 13 to 15 are relatively positioned to each other.

In the through holes 16, 16, 17, 17, 18, and 18, the through holes 16, 17, and 18 on the left side in FIG. 2 are formed into circular shapes, and the through holes 16, 17, and 18 on the right side are formed into elliptic shapes.

Since the through holes 16, 17, and 18 on the right side in FIG. 2 are formed into the elliptic shapes, it is possible to absorb assembly errors of the first to third members to be pierced 13 to 15 due to a production error of the main member 11.

The through holes 16, 16, 17, 17, 18, and 18 are formed so that their shapes and inner dimensions are continuous in the thickness directions of the first to third member to be pierced 13, 14, and 15. The through holes 17 and 17 are larger than the through holes 18 and 18, and the through holes 16 and 16 are larger than the through holes 17 and 17. When the first member to be pierced 13, the second member to be pierced 14, and the third member to be pierced 15 are stacked, the through holes 16, 16, 17, 17, 18, and 18 are coaxially placed.

Figure 4:
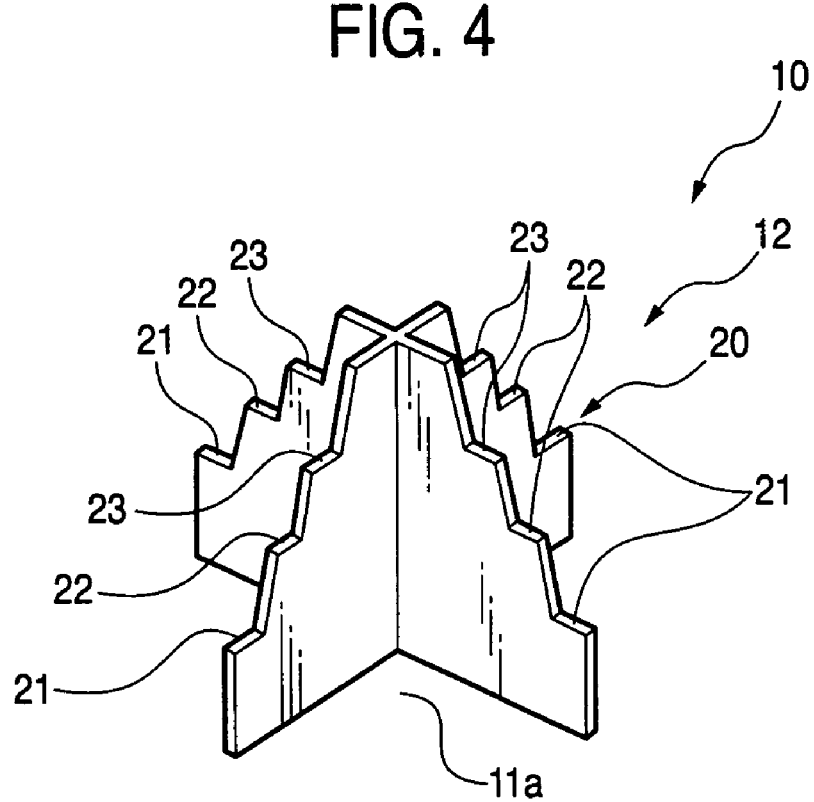
FIG. 4 is a perspective view showing main portions of the first embodiment of the invention.

As shown in FIG. 4, in the positioning structure 10 of the first embodiment, each of the bosses 12 is formed into a substantially cross shape as seen in the upstanding direction, and a positioning section 20 is provided to respectively position the first to third members to be pierced 13 to 15 (see FIG. 2) to a plurality of predetermined positions along the inserting direction (the vertical direction in FIG. 4) of the boss 12.

The positioning section 20 is formed so that the boss 12 is stepwise tapered as advancing toward the tip end, and comprises a plurality of first to third steps 21 to 23 which are arranged along the inserting direction.

Figure 5:
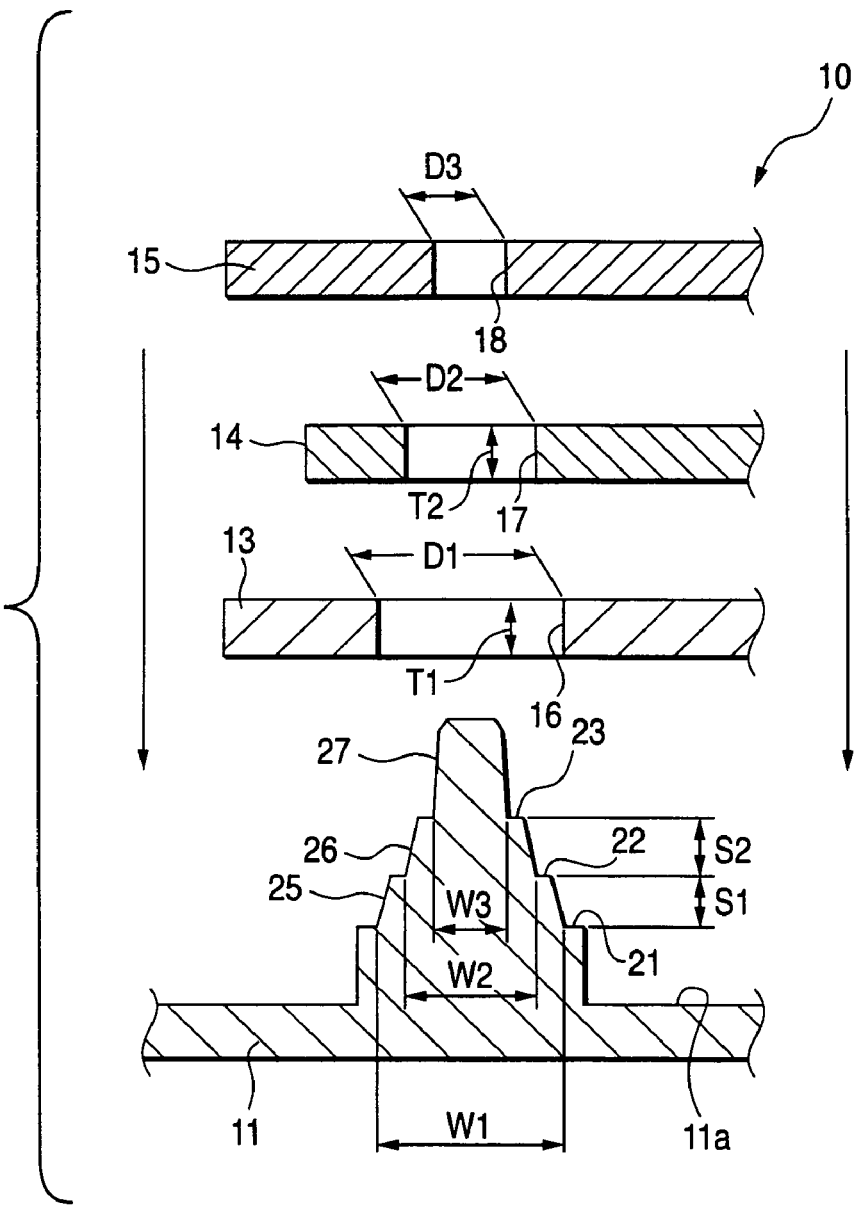
FIG. 5 is an exploded sectional view showing main portions of the first embodiment of the invention.

As shown in FIG. 5, the gap dimension S1 between the first and second steps 21 and 22 corresponds to the thickness T1 of the first member to be pierced 13. Specifically, the relationship of $S1 \geq T1$ holds.

The gap dimension S2 between the second and third steps 22 and 23 corresponds to the thickness T2 of the second member to be pierced 14. Specifically, the relationship of $S2 \geq T2$ holds.

A first inserting wall 25 between the first and second steps 21 and 22 is formed into a shape which is tapered as advancing toward the tip end of the boss 12, and a second inserting wall 26 between the second and third steps 22 and 23 is formed into a shape which is tapered as advancing toward the tip end of the boss 12.

Moreover, also a third inserting wall 27 which extends from the third step 23 toward the tip end of the boss 12 is formed into a shape which is tapered as advancing toward the tip end of the boss 12.

With respect to the maximum width W1 of the first step 21 extending perpendicularly to the inserting direction of the boss 12, the minimum inner dimension D1 of the through hole 16 of the first member to be pierced 13 corresponds to the placement position of the first member to be pierced 13. Specifically, the relationship of W1=D1 preferably holds.

With respect to the maximum width W2 of the second step 22 extending perpendicularly to the inserting direction of the boss 12, the minimum inner dimension D2 of the through hole 17 of the second member to be pierced 14 corresponds to the placement position of the second member to be pierced 14. Specifically, the relationship of W2=D2 preferably holds.

With respect to the maximum width W3 of the third step 23 extending perpendicularly to the inserting direction of the boss 12, the minimum inner dimension D3 of the through hole 18 of the third member to be pierced 15 corresponds to the placement position of the third member to be pierced 15. Specifically, the relationship of W3=D3 preferably holds.

Next, the function of the positioning structure 10 will be described with reference to FIG. 6.

First, the through hole 16 of the first member to be pierced 13 is fitted onto the first inserting wall 25 of the boss 12, thereby causing the first member to be pierced 13 to butt against the first step 21. Since the first inserting wall 25 is formed as a tapered wall, the through hole 16 can be easily fitted onto the first inserting wall 25.

Next, the through hole 17 of the second member to be pierced 14 is fitted onto the second inserting wall 26 of the boss 12, thereby causing the second member to be pierced 14 to butt against the second step 22. Since the second inserting wall 26 is formed as a tapered wall, the through hole 17 can be easily fitted onto the second inserting wall 26.

Thereafter, the through hole 18 of the third member to be pierced 15 is fitted onto the third inserting wall 27 of the boss 12, thereby causing the third member to be pierced 15 to butt against the third step 23. Since the third inserting wall 27 is formed as a tapered wall, the through hole 18 can be easily fitted onto the third inserting wall 27.

In the first embodiment described above, the first to third inserting walls 25 to 27 are formed as tapered walls which are inclined by a predetermined angle with respect to the inserting direction of the boss 12. Alternatively, the first to third inserting walls 25 to 27 may be formed as walls extending in parallel to the inserting direction of the boss 12 instead of being formed as tapered walls.

As shown in FIG. 5, the minimum inner dimension D1 of the through hole 16 of the first member to be pierced 13 corresponds to the maximum width W1 of the first step 21. Therefore, the first member to be pierced 13 can be accurately positioned with respect to the boss 12.

The minimum inner dimension D2 of the through hole 17 of the second member to be pierced 14 corresponds to the maximum width W2 of the second step 22. Therefore, the second member to be pierced 14 can be accurately positioned with respect to the boss 12.

Moreover, the minimum inner dimension D3 of the through hole 18 of the third member to be pierced 15 corresponds to the maximum width W3 of the third step 23. Therefore, the third member to be pierced 15 can be accurately positioned with respect to the boss 12.

According to the configuration, the assembly error can be suppressed to within an allowable range, so that, for example, a switch failure can be prevented from occurring.

Since the gap dimension S1 between the first and second steps 21 and 22 corresponds to the thickness T1 of the first member to be pierced 13, the first member to be pierced 13 can be placed so as to be flush with the second step 22 or slightly lower in level than the second step 22.

Since the gap dimension S2 between the second and third steps 22 and 23 corresponds to the thickness T2 of the second member to be pierced 14, the second member to be pierced 14 can be placed so as to be flush with the third step 23 or slightly lower in level than the third step 23.

According to the configuration, the soft second member to be pierced 14 can be prevented from being crushed in the thickness direction by the first and third members to be pierced 13 and 15 when the first to third members to be pierced 13 to 15 are stacked and fixed.

Since the second member to be pierced 14 is prevented from being crushed, the function of the second member to be pierced 14 can be prevented from being impaired.

Next, second to ninth embodiments of the positioning structure will be described with reference to FIGS. 7 to 15.

SECOND EMBODIMENT

Figure 7:
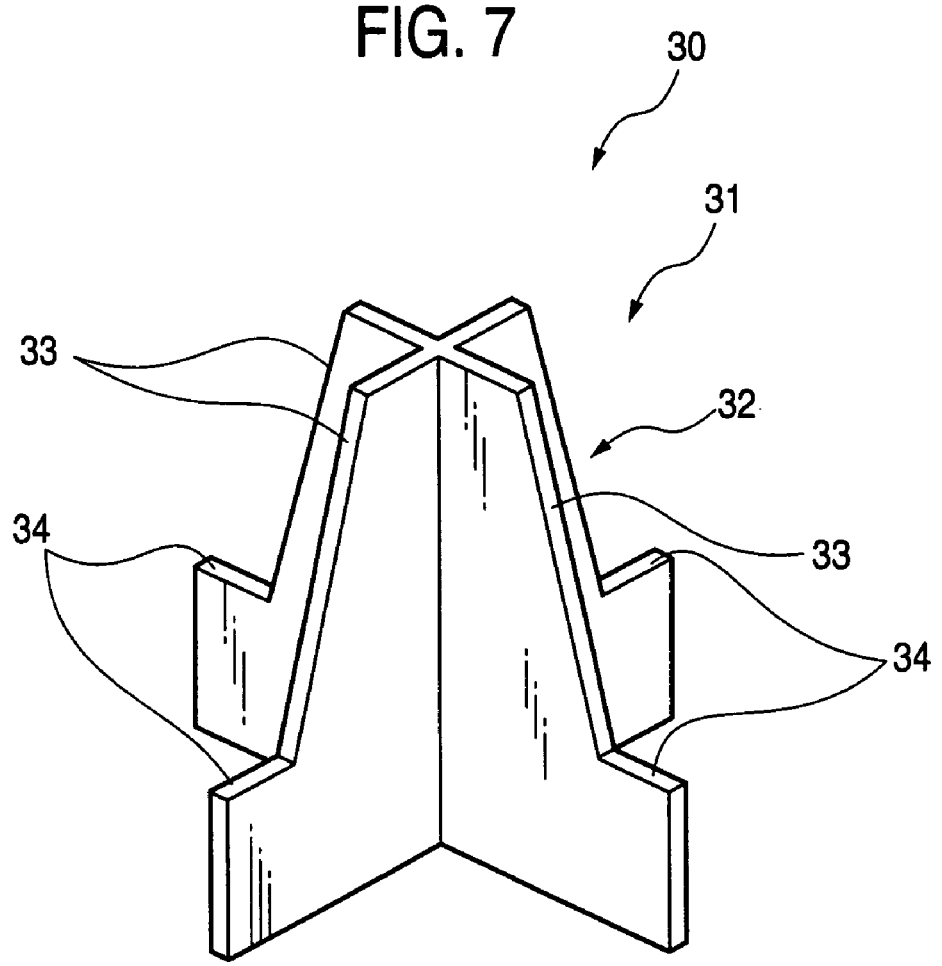
FIG. 7 is a perspective view showing a second embodiment of the positioning structure of the invention.
Figure 8:
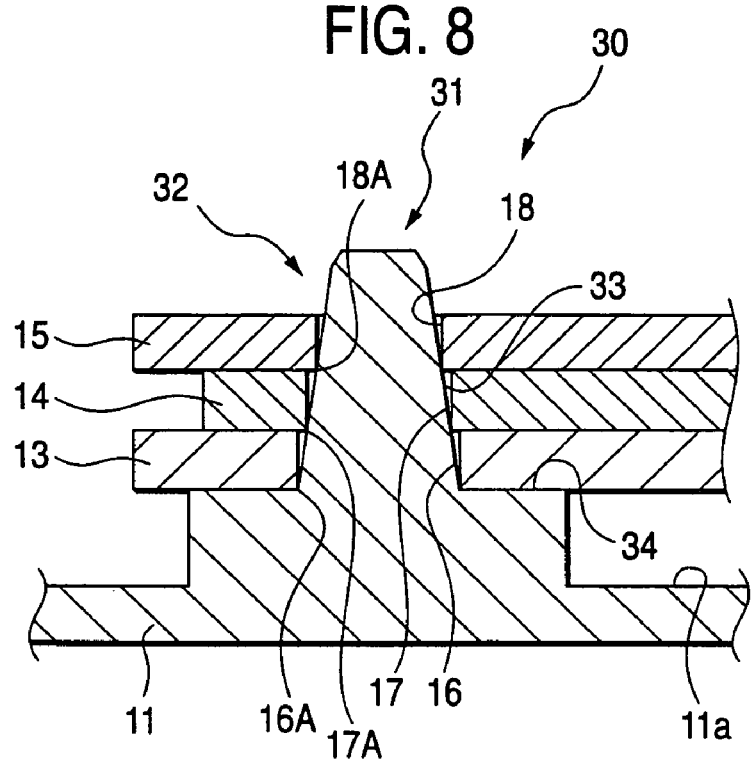
FIG. 8 is a sectional view showing the second embodiment of the invention.

In a positioning structure 30 of the second embodiment shown in FIGS. 7 and 8, each of bosses 31 is formed into a substantially cross shape as seen in the upstanding direction, and a positioning section 32 is provided to the boss to respectively position the first to third members to be pierced 13 to 15 (see FIG. 2) to positions along the inserting direction of the boss 31.

In the positioning section 32, tapered walls 33 which are continuously tapered as advancing from the basal end to the tip end are formed, and steps 34 are disposed on the side of the basal end.

The through holes 16, 17, and 18 are formed respectively in the first, second, and third members to be pierced 13, 14 and 15 so that their shapes and inner dimensions are continuous along the thickness directions of the first, second, and third members to be pierced 13, 14 and 15. The through hole 17 is larger than the through hole 18, and the through hole 16 is larger than the through hole 17. When the first member to be pierced 13, the second member to be pierced 14, and the third member to be pierced 15 are stacked, the through holes 16, 17, and 18 are coaxially placed.

With respect to the maximum width of the step 34 perpendicular to the inserting direction of the boss 31, the minimum inner dimension of the through hole 16 of the first member to be pierced 13 corresponds to the placement position of the first member to be pierced 13.

The minimum inner dimension of the through hole 17 of the second member to be pierced 14 corresponds to the maximum width perpendicular to the inserting direction in the placement position of the second member to be pierced 14 with respect to the boss 31.

The minimum inner dimension of the through hole 18 of the third member to be pierced 15 corresponds to the maximum width perpendicular to the inserting direction in the placement position of the third member to be pierced 15 with respect to the boss 31.

Next, the function of the positioning structure 30 will be described with reference to FIG. 8.

First, the through hole 16 of the first member to be pierced 13 is fitted onto the tapered walls 33 of the boss 31, thereby causing the lower end 16A of the through hole 16 to butt against the tapered walls 33, and the first member to be pierced 13 to butt against the step 34.

Since the positioning section 32 is configured by the tapered walls 33, the through hole 16 can be easily fitted onto the boss 31.

Next, the through hole 17 of the second member to be pierced 14 is fitted onto the tapered walls 33 of the boss 31, thereby causing the lower end 17A of the through hole 17 to butt against the tapered walls 33. Since the positioning section 32 is configured by the tapered wall 33, the through hole 17 can be easily fitted onto the boss 31.

Thereafter, the through hole 18 of the third member to be pierced 15 is fitted onto the tapered walls 33 of the boss 31, thereby causing the lower end 18A of the through hole 18 to butt against the tapered walls 33. Since the positioning section 32 is configured by the tapered walls 33, the through hole 18 can be easily fitted onto the boss 31.

When the through holes 16 to 18 of the first to third members to be pierced 13 to 15 are fitted onto the tapered walls 33, the lower ends 16A to 18A of the through holes 16 to 18 butt against the tapered walls 33. Therefore, the first to third members to be pierced 13 to 15 can be accurately positioned with respect to the boss 31.

When the first to third members to be pierced 13 to 15 are stacked and fixed, the soft second member to be pierced 14 can be prevented from being crushed in the thickness direction by the first and third members to be pierced 13 and 15, and the function of the second member to be pierced 14 can be prevented from being impaired.

According to the second embodiment, therefore, the same effects as those of the first embodiment can be achieved, and it is possible to attain a further effect that the positioning structure can cope with the a plurality of kinds of the first and third members to be pierced 13 and 15 of different thickness since the bosses 31 are continuously tapered as advancing from the basal end to the tip end.

THIRD EMBODIMENT

Figure 9:
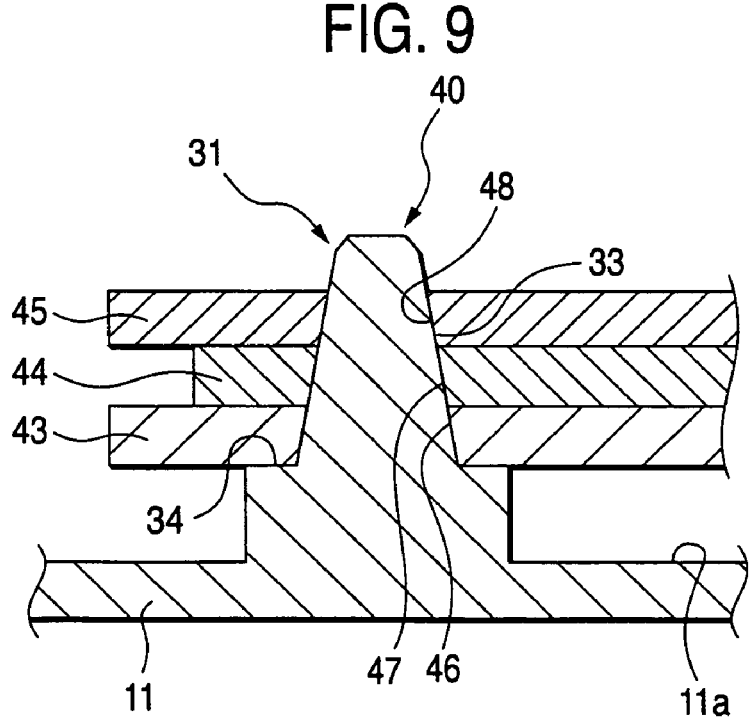
FIG. 9 is a sectional view showing a third embodiment of the positioning structure of the invention.

In the same manner as the second embodiment, in a positioning structure 40 of the third embodiment shown in FIG. 9, the tapered walls 33 of each of the bosses 31 are continuously tapered as advancing from the basal end to the tip end, and the steps 34 are disposed on the side of the basal end.

In through holes 46 to 48 of first to third members to be pierced 43 to 45, their inner peripheral faces are formed into a shape which is tapered as advancing from the rear face toward the front face.

The maximum and minimum inner dimensions of the through hole 46 of the first member to be pierced 43 are set so that the inner peripheral face of the through hole 46 is in close contact with the tapered walls 33 in the placement position of the first member to be pierced 43 with respect to the boss 31.

The maximum and minimum inner dimensions of the through hole 47 of the second member to be pierced 44 are set so that the inner peripheral face of the through hole 47 is in close contact with the tapered walls 33 in the placement position of the second member to be pierced 44 with respect to the boss 31.

The maximum and minimum inner dimensions of the through hole 48 of the third member to be pierced 45 are set so that the inner peripheral face of the through hole 48 is in close contact with the tapered walls 33 in the placement position of the third member to be pierced 45 with respect to the boss 31.

According to the positioning structure 40, the through hole 46 of the first member to be pierced 43 is fitted onto the tapered walls 33 of the boss 31, so that the through hole 46 can butt against the tapered walls 33 and the first member to be pierced 43 can butt against the step 34.

The through hole 47 of the second member to be pierced 44 is then fitted onto the tapered walls 33 of the boss 31, so that the through hole 47 can butt against the tapered walls 33.

The through hole 48 of the third member to be pierced 45 is thereafter fitted onto the tapered walls 33 of the boss 31, so that the through hole 48 can butt against the tapered walls 33.

According to the configuration, the first to third members to be pierced 43 to 45 can be accurately positioned with respect to the boss 31.

When the first to third members to be pierced 43 to 45 are stacked and fixed, the soft second member to be pierced 44 can be prevented from being crushed in the thickness direction by the first and third members to be pierced 43 and 45, and the function of the second member to be pierced 44 can be prevented from being impaired.

According to the third embodiment, therefore, the same effects as those of the first embodiment can be achieved. It is possible to attain the same effect as the second embodiment or that the positioning structure can cope with the a plurality of kinds of the first and third members to be pierced 43 and 45 of different thickness because the boss 31 is continuously tapered as advancing from the basal end to the tip end. The first to third members to be pierced 43 to 45 can be further accurately positioned with respect to the boss 31 because the inner peripheral faces of the through holes 46 to 48 of the first to third members to be pierced 43 to 45 are in close contact with the boss 31.

FOURTH EMBODIMENT

Figure 10:
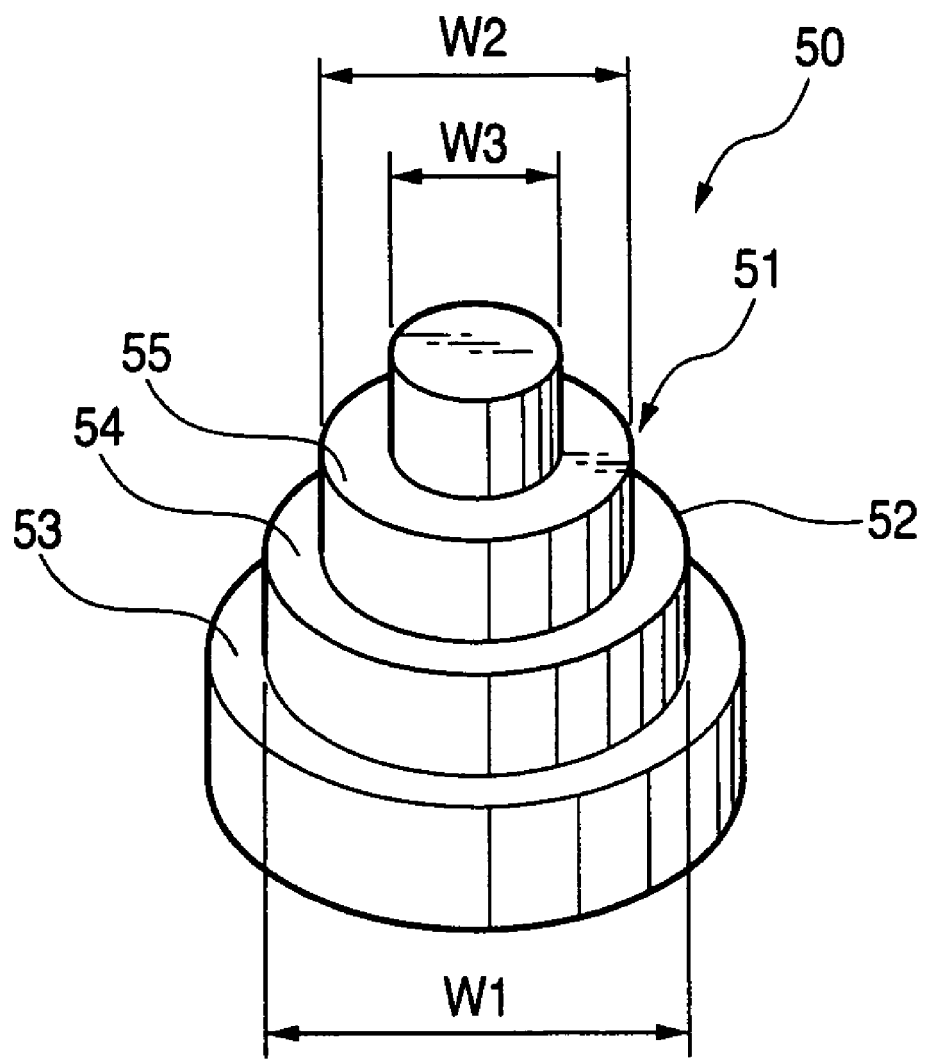
FIG. 10 is a perspective view showing a fourth embodiment of the positioning structure of the invention.

In a positioning structure 50 of the fourth embodiment shown in FIG. 10, each of bosses 51 is formed into a substantially columnar stepped shape, and a positioning section 52 is provided to the boss to respectively position the first to third members to be pierced 13 to 15 (see FIG. 2) to positions along the inserting direction of the boss 51.

The positioning section 52 comprises a plurality of first to third steps 53 to 55 which are formed so that the boss 51 is stepwise tapered as advancing to the tip end, and which elongate along the inserting direction.

The gap dimension between the first step 53 and the second step 54 in the boss 51 is not larger than the thickness of the first member to be pierced 13, and that between the second step 54 and the third step 55 is not larger than the thickness of the second member to be pierced 14.

In the boss 51, the peripheral faces of the first to third steps 53 to 55 are formed so as to be parallel to the axis of the boss 51.

The diameter W1 of the first step 53 perpendicular to the inserting direction of the boss 51 is set to be equal to the inner diameter of the through hole 16 of the first member to be pierced 13. The diameter W2 of the second step 54 perpendicular to the inserting direction of the boss 51 is set to be equal to the inner diameter of the through hole 17 of the second member to be pierced 14. The diameter W3 of the third step 55 perpendicular to the inserting direction of the boss 51 is set to be equal to the inner diameter of the through hole 18 of the third member to be pierced 15.

According to the fourth embodiment, therefore, the same effects as those of the first embodiment can be achieved. Since the bosses 51 have a substantially columnar stepped shape, moreover, a larger contact area can be ensured with respect to the rear faces of the first to third members to be pierced 13 to 15 as compared with the first to third embodiments described above. Therefore, the members to be pierced 13 to 15 can be further accurately positioned with respect to the boss 51.

FIFTH EMBODIMENT

Figure 11:
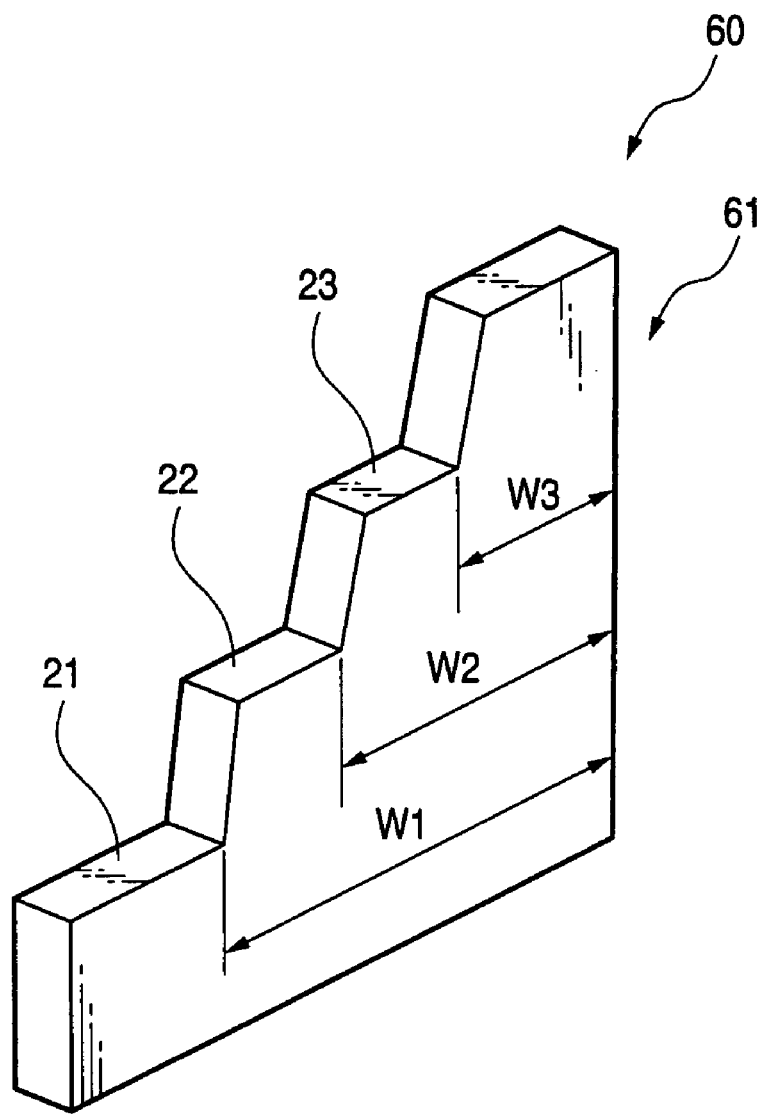
FIG. 11 is a perspective view showing a fifth embodiment of the positioning structure of the invention.

In a positioning structure 60 of the fifth embodiment shown in FIG. 11, each of bosses 61 is configured only by one of the cross parts of the substantially cross boss 12 (see FIG. 4) of the first embodiment, and formed as a flat plate.

The maximum width W1 of the first step 21 perpendicular to the inserting direction of the boss 61 is set to be equal to the inner diameter of the through hole 16 of the first member to be pierced 13. The maximum width W2 of the second step 22 perpendicular to the inserting direction of the boss 61 is set to be equal to the inner diameter of the through hole 17 of the second member to be pierced 14. The maximum width W3 of the third step 23 perpendicular to the inserting direction of the boss 61 is set to be equal to the inner diameter of the through hole 18 of the third member to be pierced 15.

In the fifth embodiment also, the same effects as those of the first embodiment can be achieved. Since the structure of the boss 61 can be more simplified than that in the first embodiment, the cost of molds can be lowered, and hence the production cost can be reduced.

SIXTH EMBODIMENT

Figure 12:
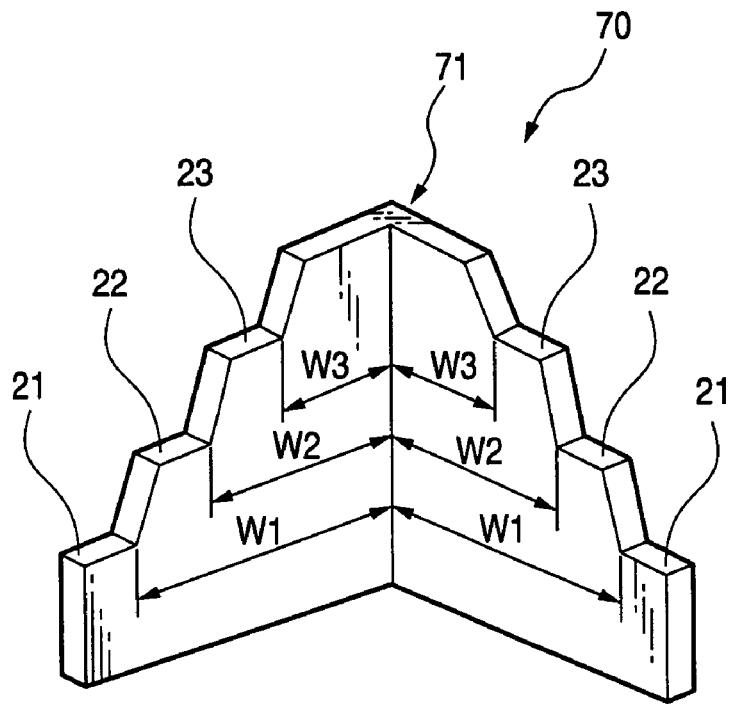
FIG. 12 is a perspective view showing a sixth embodiment of the positioning structure of the invention.

In a positioning structure 70 of the sixth embodiment shown in FIG. 12, each of bosses 71 is configured only by two of the cross parts of the substantially cross boss 12 (see FIG. 4) of the first embodiment, and formed into an L-like shape in a plan view. In other words, the boss 71 in the sixth embodiment is formed by combining a pair of the bosses 61 in the fifth embodiment.

The combined value of the maximum widths W1 of the first steps 21,21 and perpendicular to the inserting direction of the boss 71 is set to be equal to the inner diameter of the through hole 16 of the first member to be pierced 13. The combined value of the maximum widths W2, W2 of the second steps 22,22 perpendicular to the inserting direction of the boss 71 is set to be equal to the inner diameter of the through hole 17 of the second member to be pierced 14. The combined value of the maximum widths W3, W3 of the third steps 23,23 and perpendicular to the inserting direction of the boss 71 is set to be equal to the inner diameter of the through hole 18 of the third member to be pierced 15.

In the boss 71, a corner as seen from a direction along the inserting direction is placed along the axes of the through holes 16, 17, and 18.

In the sixth embodiment also, the same effects as those of the fifth embodiment can be fundamentally achieved. Since the boss 71 is formed into an L-like shape in a plan view, a higher self-standing strength can be ensured as compared with the boss 61 in the fifth embodiment described above.

SEVENTH EMBODIMENT

Figure 13:
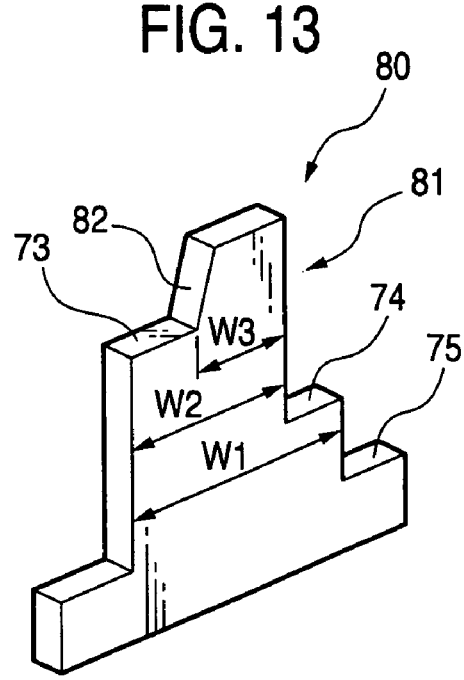
FIG. 13 is a perspective view showing a seventh embodiment of the positioning structure of the invention.

In a positioning structure 80 of the seventh embodiment shown in FIG. 13, each of bosses 81 is formed as a flat plate in the same manner as the fifth embodiment, and a positioning section 72 is provided to the boss 81 to respectively position the members to be pierced 13 to 15 (see FIG. 2) to the a plurality of predetermined positions along the inserting direction of the boss 81.

The positioning section 82 comprises a plurality of first to third steps 73 to 75 which are formed into a shape that is asymmetrical about a line along the inserting direction, and that is stepwise tapered as advancing to the tip end, and which extends perpendicularly to the inserting direction.

The maximum width W1 of the step 73 and perpendicular to the inserting direction of the boss 81 corresponds to the minimum inner dimension of the through hole 16 of the first member to be pierced 13.

The maximum width W2 of the step 74 of the boss 81 corresponds to the minimum inner dimension of the through hole 17 of the second member to be pierced 14.

The maximum width W3 of the step 75 of the boss 81 corresponds to the minimum inner dimension of the through hole 18 of the third member to be pierced 15.

The seventh embodiment achieves the same effects as those of the first embodiment, and can cope with also the case where the through holes 16 to 18 of the first to third members to be pierced 13 to 15 are different from each other in shape, size, etc.

EIGHT EMBODIMENT

Figure 6:
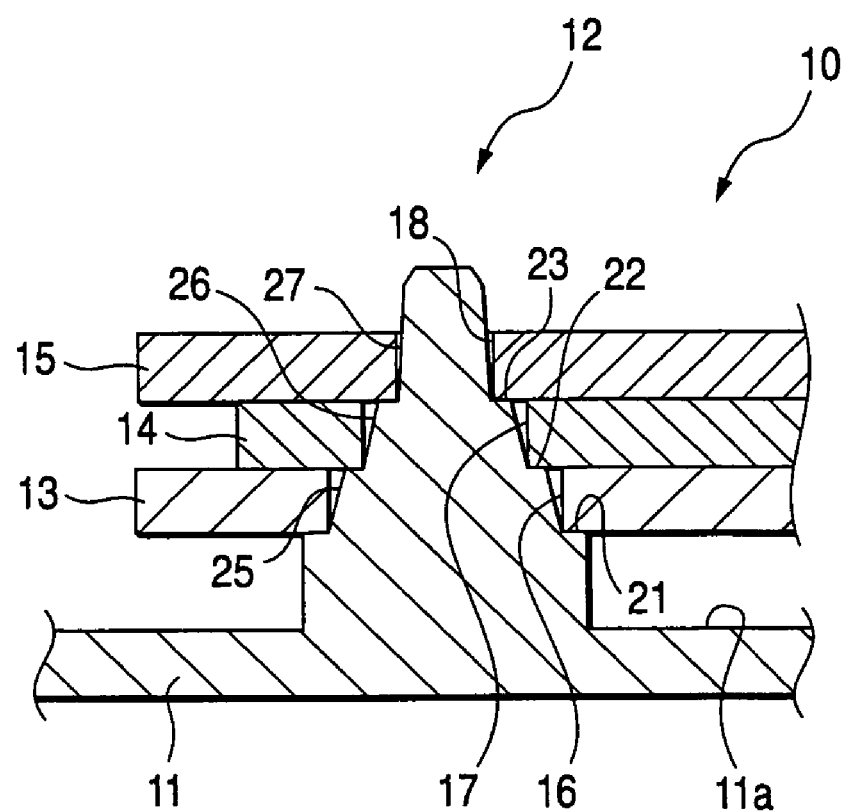
FIG. 6 is a sectional view showing main portions of the first embodiment of the invention.
Figure 14:
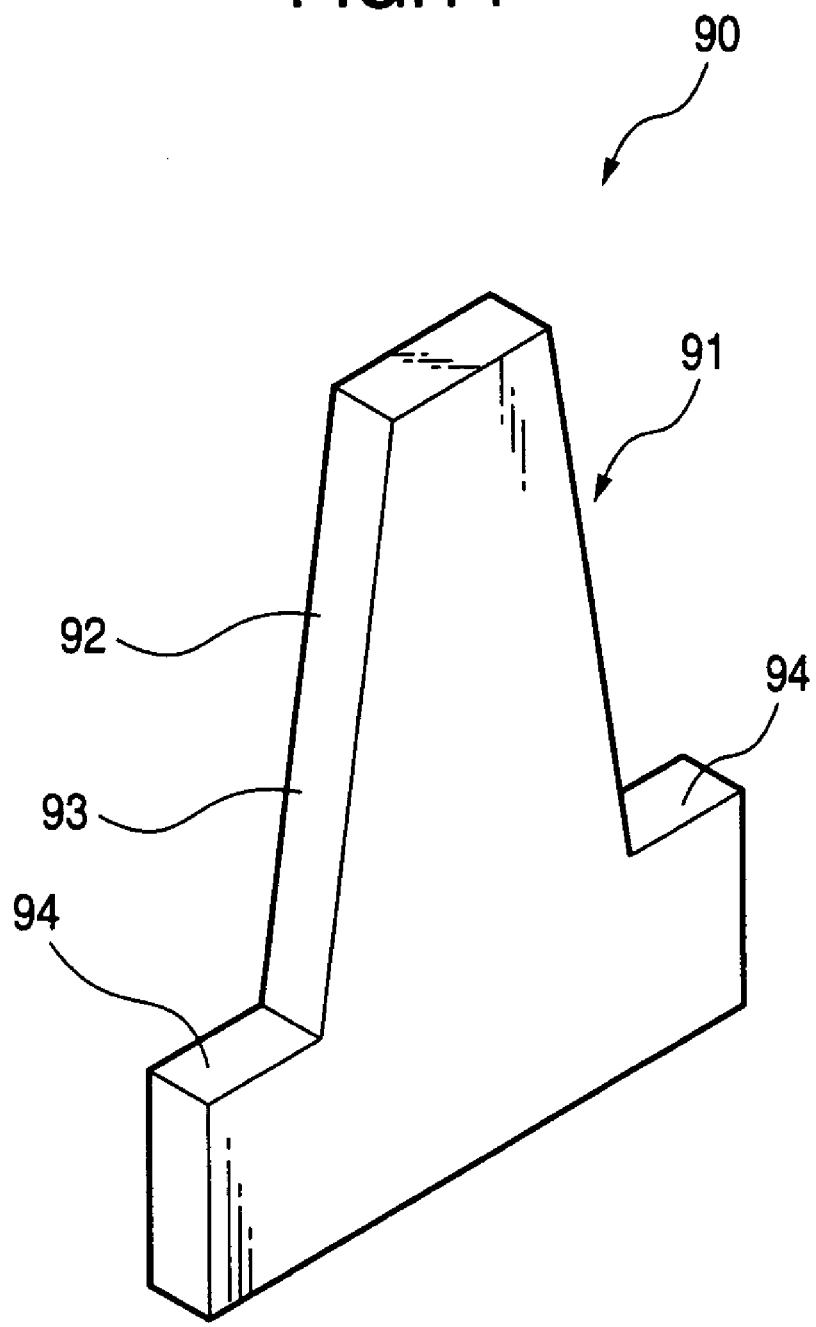
FIG. 14 is a perspective view showing an eighth embodiment of the positioning structure of the invention.

In a positioning structure 90 of the eighth embodiment shown in FIG. 14, employed are bosses 91 which are obtained by changing the cross shape of the bosses 31 of the positioning structure 30 of the second embodiment shown in FIG. 6, to a linear shape. In each of the bosses 91, a positioning section 92 is provided which positions respectively first to third members to be pierced 95 and 97 (see FIG. 15) to positions arranged along the inserting direction of the boss 91.

In the positioning section 92, tapered walls 93 are formed so that the boss 91 is continuously tapered as advancing toward the tip end, and steps 94 are provided.

Figure 15:
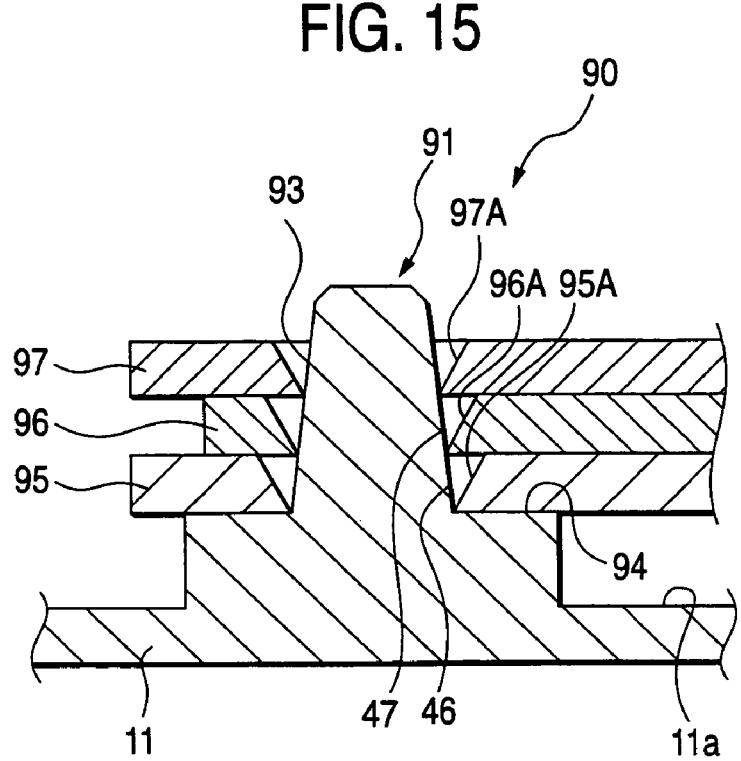
FIG. 15 is a sectional view showing the eighth embodiment of the invention.

As shown in FIG. 15, each of through holes 95A to 97A of the first to third members to be pierced 95 and 97 is formed into a tapered shape in which the hole diameter is gradually increased as advancing from the lower side to the upper side.

With respect to the maximum width of step 94 perpendicular to the inserting direction of the boss 91, the minimum inner dimension of the through hole 95A of the first member to be pierced 95 corresponds to the placement position of the first member to be pierced 95.

In the placement position of the second member to be pierced 96 with respect to the boss 91, the minimum inner dimension of the through hole 96A of the second member to be pierced 96 corresponds to the maximum width perpendicular to the inserting direction.

In the placement position of the third member to be pierced 97 with respect to the boss 91, the maximum inner dimension of the through hole 97A of the third member to be pierced 97 corresponds to the maximum width perpendicular to the inserting direction.

According to the positioning structure 90 of the eighth embodiment, when the through holes 95A to 97A of the first to third members to be pierced 95 to 97 are fitted onto the tapered walls 93, the lower portions of the through holes 95A to 97A butt against the tapered walls 93. Therefore, the first to third members to be pierced 95 to 97 can be accurately positioned with respect to the boss 91.

When the first to third members to be pierced 95 to 97 are stacked and fixed, the soft second member to be pierced 96 can be prevented from being crushed in the thickness direction by the first and third members to be pierced 95 and 97, and the function of the second member to be pierced 96 can be prevented from being impaired.

According to the eighth embodiment, therefore, the same effects as those of the first embodiment can be achieved, and the structure can be simplified because the bosses 91 are formed by changing the cross shape of the bosses 31 of the positioning structure 30 of the second embodiment to the linear shape.

NINTH EMBODIMENT

Figure 16:
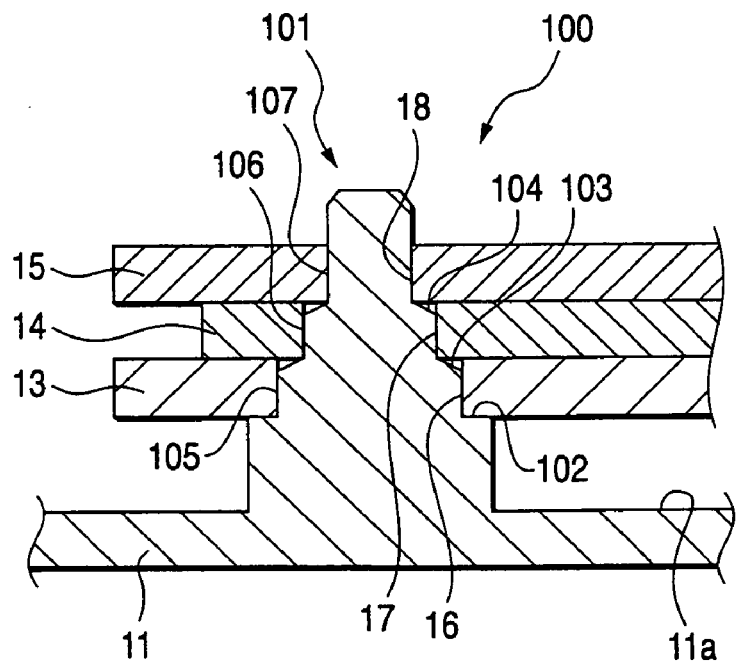
FIG. 16 is a sectional view showing a ninth embodiment of the positioning structure of the invention.

In a positioning structure 100 of the ninth embodiment shown in FIG. 16, in the same manner as the positioning section 20 in the first embodiment, each of bosses 101 is formed so as to be stepwise tapered as advancing toward the tip end, and a plurality of steps 102 to 104 which are arranged along the inserting direction are provided.

The first step 102 is formed as a horizontal face in the same manner as the first embodiment. By contrast, the second and third steps 103 and 104 are formed as inclined faces.

In the first embodiment, the first to third inserting walls 25 to 27 (see FIG. 5) are formed into a tapered shape. By contrast, first to third inserting walls 105 to 107 in the ninth embodiment are formed as straight wall faces.

With respect to the maximum width of the step 102 perpendicular to the inserting direction of the boss 101, the minimum inner dimension of the through hole 16 of the first member to be pierced 13 corresponds to the placement position of the first member to be pierced 13.

The minimum inner dimension of the through hole 17 of the second member to be pierced 14 corresponds to the maximum width perpendicular to the inserting direction in the placement position of the second member to be pierced 14 with respect to the boss 101.

The maximum inner dimension of the through hole 18 of the third member to be pierced 15 corresponds to the maximum width perpendicular to the inserting direction in the placement position of the third member to be pierced 15 with respect to the boss 101.

In the ninth embodiment also, the same effects as those of the first embodiment can be attained. Since the second and third steps 103 and 104 are formed as inclined faces, moreover, the second and third members to be pierced 14 and 15 in which the minimum inner dimension of the through hole 17 and the maximum inner dimension of the through hole 18 are large can be fixed.

The invention is not limited to the above-described embodiments, and may be adequately modified or improved. The material, the shape, the dimensions, the form, the number, the placement position, the thickness, and so on of the positioning sections, the steps, the members to be pierced, the through holes, and the like which are exemplarily shown in the embodiments may be arbitrarily selected and not particularly limited as far as the invention can be achieved.

What is claimed is:

1. A positioning structure comprising:

a main member;

a boss upstanding from the main member, the boss having a positioning section; and a plurality of members to be pierced each having a through hole through which the boss is inserted whereby the members to be pierced are stacked and fixed and the main member and the members to be pierced are relatively positioned to each other, wherein the positioning section positions the members to be pierced to predetermined positions along an inserting direction of the boss, respectively, wherein the positioning section is configured by a plurality of steps which are disposed by forming the boss into a shape that is stepwise tapered as advancing toward a tip end, and wherein, widths of the steps of the boss in a direction perpendicular to the inserting direction are equal to minimum inner dimensions of the through holes of the members corresponding to placement positions, respectively.

2. A positioning structure comprising:

a main member;

a boss upstanding from the main member, the boss having a positioning section; and a plurality of members to be pierced each having a through hole through which the boss is inserted whereby the members to be pierced are stacked and fixed and the main member and the members to be pierced are relatively positioned to each other, wherein the positioning section positions the members to be pierced to predetermined positions along an inserting direction of the boss, respectively, wherein the positioning section is configured by a plurality of steps which are disposed by forming the boss into a shape that is stepwise tapered as advancing toward a tip end, and wherein vertical gap dimensions between the steps in the inserting direction correspond to thickness of the members to be pierced, respectively.

3. A positioning structure comprising:

a main member;

a boss upstanding from the main member, the boss having a positioning section; and a plurality of members to be pierced each having a through hole through which the boss is inserted whereby the members to be pierced are stacked and fixed and the main member and the members to be pierced are relatively positioned to each other, wherein the positioning section positions the members to be pierced to predetermined positions along an inserting direction of the boss, respectively, and wherein the boss is formed into a shape that is continuously tapered as advancing toward a tip end, and, widths of the boss in a direction perpendicular to the inserting direction are equal to minimum inner dimensions of the through holes of the members corresponding to placement positions, respectively.

* * * * *